US005230146A

United States Patent [19]

Tsuji et al.

[11] Patent Number: 5,230,146

[45] Date of Patent: Jul. 27, 1993

[54] METHOD AND APPARATUS FOR ASSEMBLING WIRE HARNESS

[75] Inventors: Yoshitsugu Tsuji, Suzuka; Soji Kihira, Mie; Katsuaki Toba, Tsu; Yutaka Noro, Matsusaka, all of Japan

[73] Assignee: Sumitomo Wiring Systems, Ltd., Mie, Japan

[21] Appl. No.: 882,278

[22] Filed: May 13, 1992

[30] Foreign Application Priority Data

May 17, 1991 [JP] Japan .............................. 3-113029

[51] Int. Cl.[5] ..................... H01R 43/04; B23P 19/00

[52] U.S. Cl. .................................. 29/861; 29/33 M; 29/749; 29/759

[58] Field of Search ............ 29/749, 759, 861, 566.3, 29/33 M, 753

[56] References Cited

U.S. PATENT DOCUMENTS 4,117,585 10/1978 Smith .............................. 29/759 X
4,126,935 11/1978 Rhines et al. .
4,235,015 11/1980 Funcik et al. .................... 29/749 X
4,333,230 6/1982 Funcik et al. ......................... 29/749
4,404,743 9/1983 Brandewie et al. ............. 29/749 X
4,419,817 12/1983 Funcik et al. ......................... 29/749
4,766,668 8/1988 Urness et al. ......................... 29/749

FOREIGN PATENT DOCUMENTS 2139925 11/1984 United Kingdom .
2153264 8/1985 United Kingdom .

*Primary Examiner*—Carl J. Arbes
*Attorney, Agent, or Firm*—Sughrue, Mion, Zinn, Macpeak & Seas

[57] ABSTRACT

A method for assembling a wire harness and an apparatus for carrying out the method. Main wires serving as the main line of the wire harness are arranged horizontally and in parallel with each other. A required portion of each main wire held by a cover installed at the leading end portion of a rod is dropped to a predetermined lower position so as to obtain a branch wire. The cover holding the branch wire is inserted into a terminal-accommodating chamber of a connector disposed at a lower position so as to connect the connector with the branch wire. Then, the rod formed on the cover is removed therefrom by moving the rod upwardly. The covers, which are spaced apart from each other, are made to be close to each other to insert them into the connector. A cutter mounted on the connector jig accommodating the connector cuts unnecessary wires connected with the connector.

10 Claims, 7 Drawing Sheets

METHOD AND APPARATUS FOR ASSEMBLING WIRE HARNESS

BACKGROUND OF THE INVENTION

1. Field of the Invention

The present invention relates to a method for assembling a wire harness and an apparatus for carrying the method and more particularly to a method suitable for assembling the wire harness for use in an automobile comprising wires, bent at many points, consisting of main wires serving as a main line and to be connected with a connector terminal at both ends thereof and a plurality of branch wires formed by bending the main wire and a jig suitable, for forming branch wires from the main wires, to be used in carrying out the method and a jig suitable for accommodating a connector to be connected with the branch wires.

2. Description of the Related Arts

According to methods for automatically assembling a wire harness proposed in Japanese Patent Laid-Open Publications No. 57-95016, No. 57-25612, and No. 59-217976, one end of an electric wire (E) introduced from a reel is connected with a connector 1A and the other end thereof is connected with a connector 1B as shown in FIGS. 12 and 14.

In automatically assembling the wire harness having a plurality of wire groups 3A, 3B, and 3C and wires branched therefrom, wires are pulled out from the reel and moved forward to each predetermined position with branch connectors 4A, 4B, and 4C connected with the forward end of each of the wire groups 3A, 3B, and 3C. Then, the wire groups 3A, 3B, and 3C are connected with a gathering connector 5. When the wire groups 3A, 3B, and 3C reach a predetermined position, respectively due to the forward movement of the gathering connector 5, branch connectors 6A and 6B are mounted on the backward end thereof.

According to the conventional method for automatically assembling the wire harness having main wires and branch wires, the wires are not branched from a required position thereof, but a part of a plurality of wire groups is connected with the gathering connector at one end thereof. For example, it is necessary to unwind all required wires in parallel with each other from the reel so as to obtain branch wire groups and consequently, there are many wires arranged in parallel with each other. Therefore, the wire harness occupies a large space in an automobile and may not be installed in a small area. The number of terminals to be mounted on wires increases with the increase of the number of wires, which necessitates the provision of a large connector for accommodating the terminals. Thus, the increase of parts and the use of the large connector inturn increases the cost and labor. According to the conventional method, it is necessary to move each branch wire group forward or stop it to place it in position. Consequently, the assembling operation is complicated and therefore, an assembling apparatus is complicated and large.

As described above, the conventional method has many problems. In automatically assembling the wire harness for use in an automobile, it is necessary to obtain many branch wires from the main wires. Thus, it is difficult for the conventional method to automatically assemble the wire harness.

SUMMARY OF THE INVENTION

It is an object of the present invention to provide a method for automatically assembling a wire harness comprising branch wire groups obtained by bending main wires, serving as a main line of the wire harness, arranged in parallel with each other at a certain position thereof and to be connected with a connector at both ends of each main wire and a jig to be used in carrying out the method.

In accomplishing this and other objects of the present invention, there is provided a method for assembling a wire harness comprising a plurality of main wires serving as a main line of the wire harness and a plurality of branch wires branched from the wires, comprising the steps of: arranging the main wires in parallel with each other and holding each of the leading ends thereof at a certain position; holding a cover installed at the leading end portion of a rod at an arbitrary position of each of the main wires; moving the rod downwardly with one of the main wires inserted into a wire-accommodating groove formed on the cover; dropping the main wire held by the cover while the main wire is being unwound from a reel; connecting the main wire, with a connector, inserted into a terminal-accommodating chamber of the connector set at a predetermined lower position; removing the rod from the cover by moving the rod upwardly.

In the above method, preferably, the rod is moved downwardly so that the covers are dropped to each predetermined lower position; made to be close to each if the covers are distant from each other; and inserted into the terminal-accommodating chambers, adjacent to each other, formed in the connector.

In the above method, preferably, the main wire held by the cover is dropped to a predetermined position with the connector inserted into a connector jig; the cover is inserted into the terminal-accommodating chamber of the connector so as to connect the main wire with the connector; and an unnecessary portion of the main wire is cut by a cutter mounted on the connector.

According to a preferred embodiment, there is provided a method for assembling a wire harness comprising the steps of: drawing out a plurality of main wires horizontally from a reel horizontally and in parallel with each other with a predetermined space provided between the main wires along rollers; and holding each of the leading ends of the main wires at a predetermined position; moving a rod disposed above each main wire downwardly; inserting each required main wire into a wire-accommodating groove of a cover held at the leading end of the rod; dropping each main wire simultaneously from an arbitrary position thereof between adjacent rollers so that the length of each main wire is equal t each other; and holding each main wire at a predetermined position; gathering the covers so that the covers are close to each other by a pipe movable lengthwise; moving the rod downwardly to insert the cover holding the main wire into each terminal-accommodating chamber of a connector installed in a connector jig set at a predetermined lower position; and pressing a terminal accommodated in the terminal-accommodating chamber against the main wires held by each cover so as to connect the main wires and the terminal with each other; and cutting an unnecessary portion of the branch wire by a cutter provided on the connector jig; moving the rod upwardly to remove the rod from the cover; and connecting both end portions of each main wire with a connector, respectively.

An apparatus for assembling a wire harness according to the present invention comprises: first means for arranging a plurality of main wires horizontally and in parallel with each other; second means for obtaining branch wires from predetermined main wires each held by a cover disposed at the lower end portion of a rod by dropping a required portion of each main wire; third means for making the covers close to each other; and a connector jig holding therein a connector removable therefrom so that the covers gathered and moved downwardly by the rod can be inserted into each terminal-accommodating chamber of the connector.

In the above apparatus, the first means comprises a reel for feeding out a plurality of main wires therefrom horizontally and in parallel with each other; a holding frame having a plurality of openings for passing each main wire therethrough so that the interval between adjacent main wires arranged in parallel with each other is equal to the interval between the adjacent connectors for connecting the main wires fed out from the reel; and a plurality of rollers spaced at regular intervals and disposed between the holding frame and a position at which the leading end of each main wire is held.

In the above apparatus, the second means comprises the rod disposed above the arranged main wires and moved vertically by a driving means; and a cover removably held at the lower end portion of the rod and having a wire-accommodating groove for fitting one arranged main wire thereinto, wherein the rod moves the cover downwardly to drop each of the arranged main wires to a lower predetermined position so as to obtain branch wires from the main wires.

In the above apparatus, the cover has a concave for positioning the cover on the lower surface thereof; and an air sucking opening, communicating with the concave, formed in the axial direction thereof; the cover has a projection which engages the concave on the upper surface thereof; the wire-accommodating groove, sectionally semicircular and formed continuously through the front and rear side surfaces and bottom surface thereof, capable of holding one wire therein; and an opening, for gathering the main wires, penetrating therethrough between the left and right surfaces thereof.

In the above apparatus, the third means comprises a small-diameter pipe which is removably inserted through the opening formed widthwise through the cover and a large-diameter pipe movable with the small-diameter pipe slidably inserted thereinto so as to gather the covers, spaced a certain distance from each other, holding the main wires dropped to the lower predetermined position.

In the above apparatus, the connector jig has a cutter for cutting unnecessar portions of the branch wires held by the cover inserted into the terminal-accommodating chamber of the connector set in the connector jig.

In the above apparatus, a cutter may be provided on both sides of each terminal-accommodating chamber in correspondence thereto so that the cutters are movable along the outer surface of the connector jig or only one cutter may be movably provided on both sides of each terminal-accommodating chamber so that all wires on the same side can be cut.

According to the method of the present invention, a desired wire group serving as the main line of the wire harness is dropped from a required position thereof. The leading end of the dropped wire group is connected with a connector at the position where it has been dropped. Therefore, the branch wire group can be easily obtained from the wire group even though it is necessary to obtain many branch wire groups.

The jig comprising the rod and the cover connects the branch wires with the connector successively to the provision of the branch wires from the main wires. Thus, operation for assembling the wire harness can be performed with efficiency with an assembling apparatus which is compact and simple in its construction.

The covers holding the branch wires spaced apart from each other are gathered. Therefore, there are no vacant chambers in the terminal-accommodating chamber. If the covers are not gathered, it is necessary to form nine terminal-accommodating chambers, while if the covers are gathered, five chambers suffices. Hence, the terminal of the present invention is compact.

The cutter for cutting the wire is mounted on the connector jig. Therefore, the cutter is capable of cutting spray portions of the wires immediately after the desired wires are connected with the connector by inserting the cover into the terminal-accommodating chamber. Hence, a high operation efficiency can be obtained.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
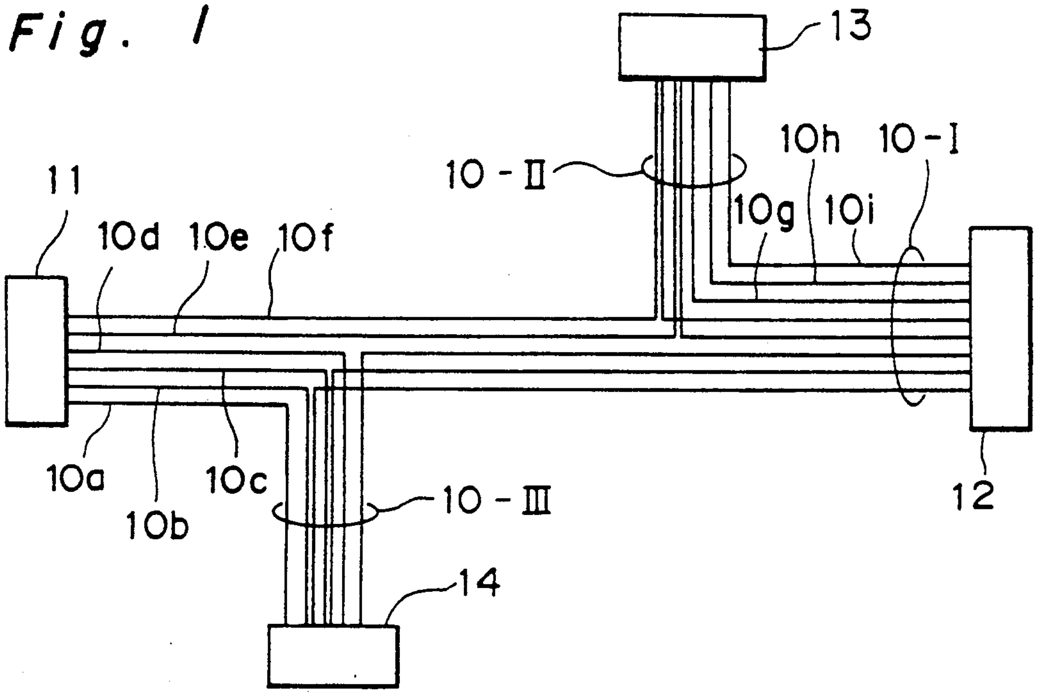
FIG. 1 is a schematic view showing a wire harness assembled by the method of the present invention.

Before the description of the present invention proceeds, it is to be noted that like parts are designated by like reference numerals throughout the accompanying drawings.

With reference to the drawings, a method for automatically assembling a wire harness and an apparatus for carrying out the method according to an embodiment of the present invention is described. Connectors 11 and 12 are mounted on each end of main electric wires 10-I serving as a main line. Required wires 10 of the main wire 10-I are branched (bent) at a predetermined position to form branch (bent) wire groups 10-II and 10-III. Connectors 13 and 14 are mounted on the leading end of the branch wire groups 10-II and 10-III.

Referring to FIG. 1, the connector 11 of the main wires 10-I is connected with a connector on the power source and the connector 12 thereof is connected with a connector on the signal source. The connectors 13 and 14 to be mounted on the branch wire 10-II and 10-III are connected with a connector of a left head light and a connector on a right head light, respectively.

A wire harness comprising the main wires 10-I and the branch wires 10-II and 10-III obtained by bending the main wires 10-I at each required point thereof is automatically assembled by processes as described below.

Figure 2:
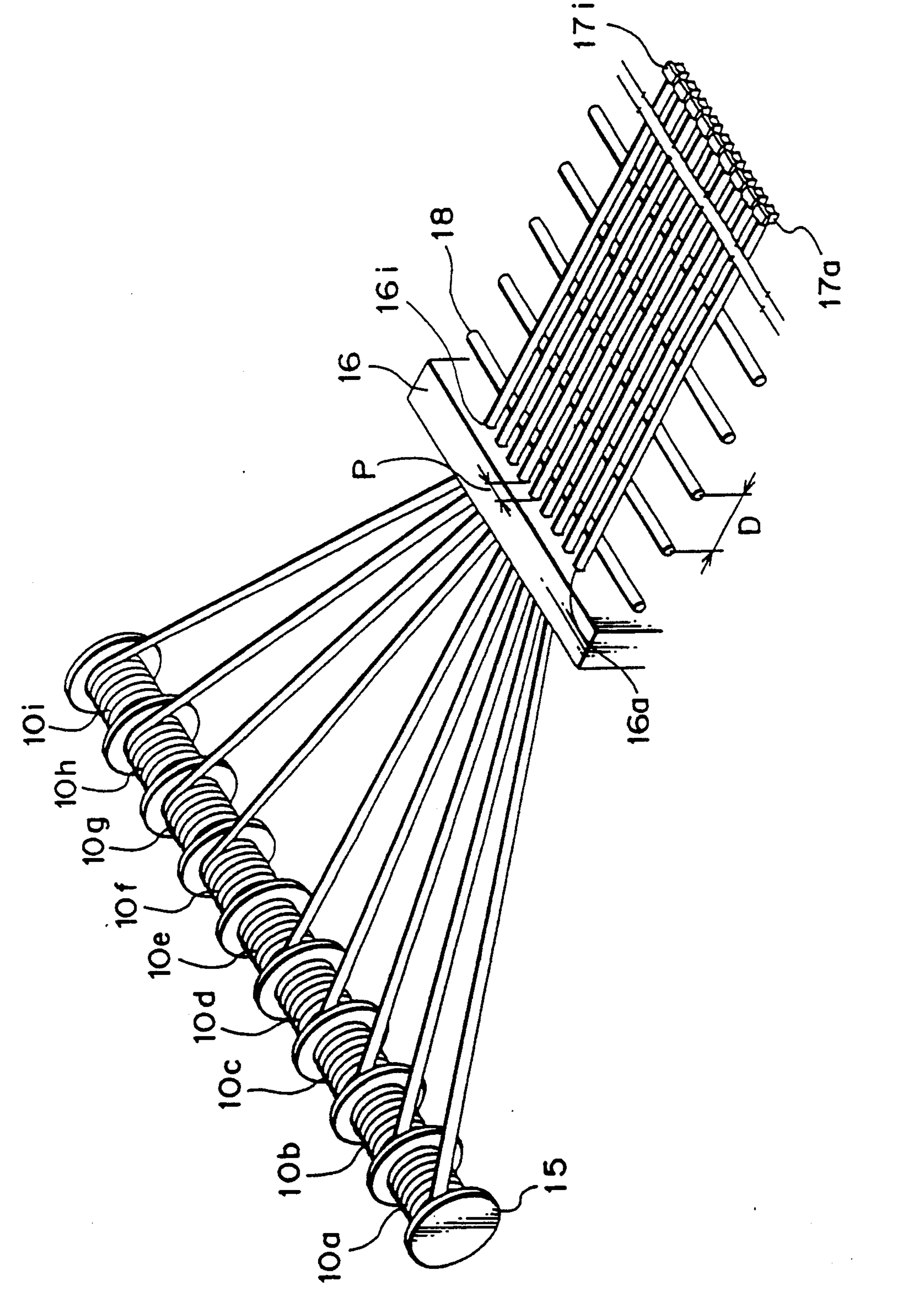
FIG. 2 is a perspective view showing process of arranging wires according to the method of the present invention.

Required wires 10*a* through 10*i* wound in parallel with each other around a reel 15 are drawn out therefrom horizontally through inserting openings 16*a* through 16*i* of a holding frame 16 by using a wiring means as shown in FIG. 2. The pitch (P) of the openings 16*a* through 16*i* is set to be equal to the pitch (P') of terminals of a connector to be mounted on these wires.

Each of heads 17*a* through 17*i* integrated with each other and mounted on the leading end of each wire 10*a* through 10*i* inserted through each inserting opening 16*a* through 16*i* is drawn forward to pull out the wires 10*a* through 10*i* forward from the reel 15. The means for pulling the wires 10*a* through 10*i* may be performed by another method.

The heads 17*a* through 17*i* are held by a holding means (not shown) at a predetermined holding position located forwardly. The holding position and installing position of the holding frame 16 correspond to the connectors 12 and 11 of FIG. 1, respectively. Rollers 18 are rotatably disposed at regular intervals (D) in the wire-feeding direction between the holding position and the holding frame 16. The wires 10*a* through 10*i* are pulled out from the reel 15 along the upper surfaces of the rollers 18. Thus, the main wires 10-I are arranged.

When the main wires 10-I have been arranged, the leading end of each wire 10*a* through 10*i* is held at the holding position while the backward portion of each wire 10*a* through 10*i* inserted through each of the inserting openings 16*a* through 16*i* remains wound around the reel 15. Therefore, each wire can be pulled out from the reel 15.

Figure 3:
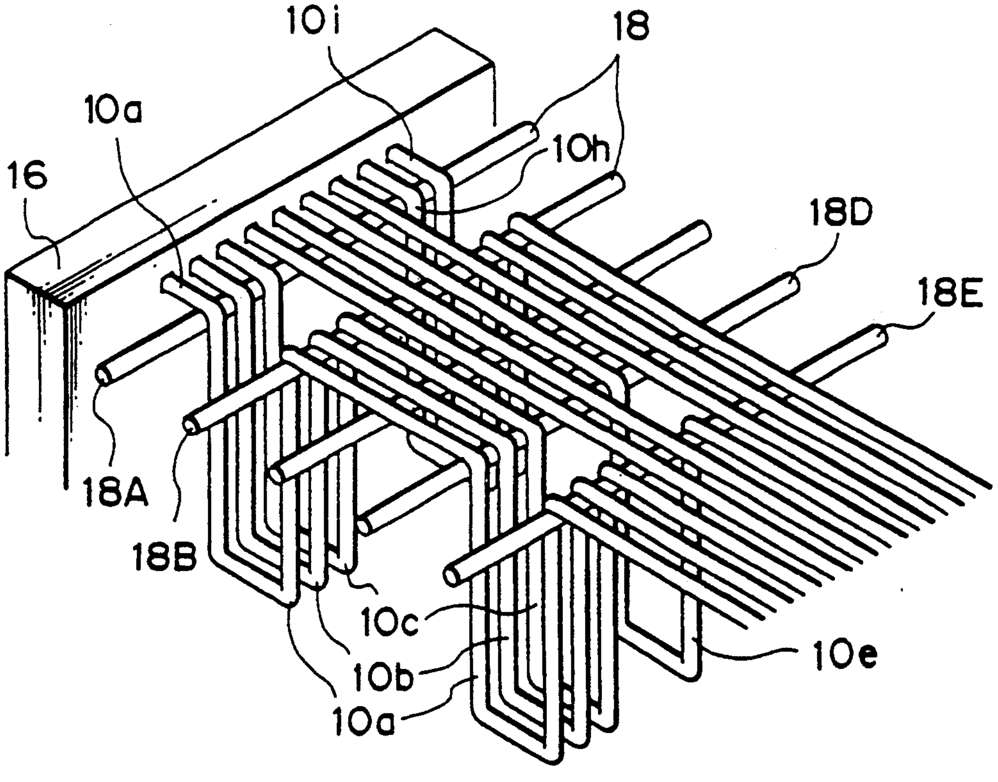
FIG. 3 is a perspective view showing process of adjusting the length of wires according to the method of the present invention.

As shown in FIG. 3, in order to form the branch wires 10-II and 10-III from the main wires 10-I by bending each of the main wires 10-I downward at a required position between adjacent rollers 18, a means 20 comprising a vertical rod 21 and a cover 22 is used to make the lengths of the main wires 10-I equal to each other.

Figure 7:
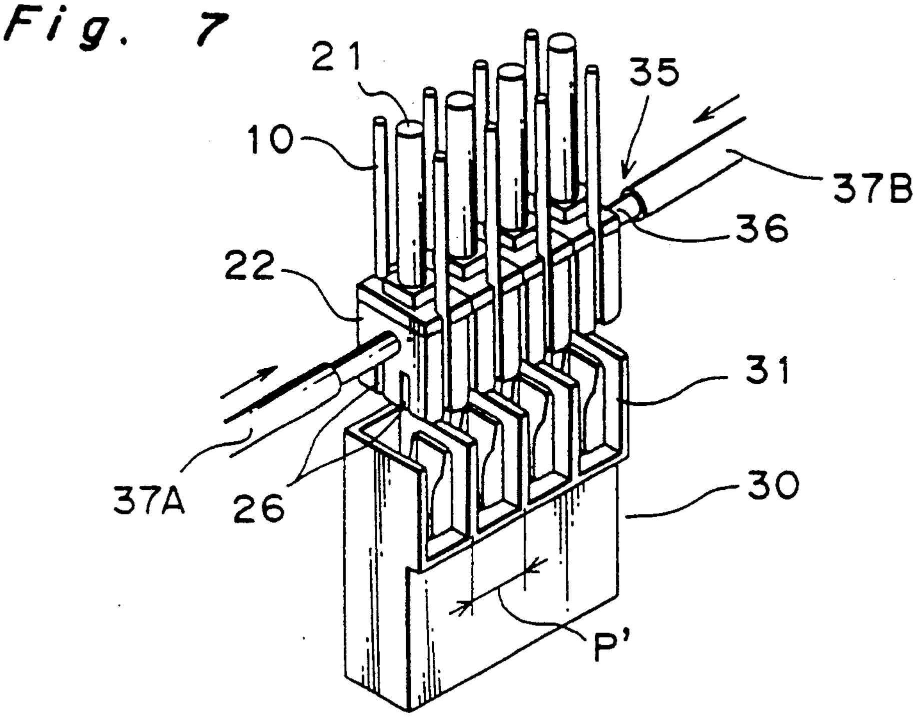
FIG. 7 is a perspective view showing a gathering process according to the method of the present invention.

The adjusting means 20 is provided for each wire. The rod 21 is used only in obtaining the branch wires 10-II and 10-III from the main wires 10-I. The cover 22 is held at the lower end of the rod 21 so that the wires 10 are dropped into the cover 22 at a lower predetermined position with the wires 10 arranged in parallel with each other. The cover 22 holding the wires 10 thereon is accommodated in a connector 30 as shown in FIG. 7.

An elevating means (not shown) such as an air cylinder supports the rods 21 above each wire 10*a* through 10*i*. The rod 21 is movable in the longitudinal direction of the wires 10*a* through 10*i*. A desired wire 10 is bent downward at a required position so as to obtain the branch wires 10-II and 10-III.

Figure 5:
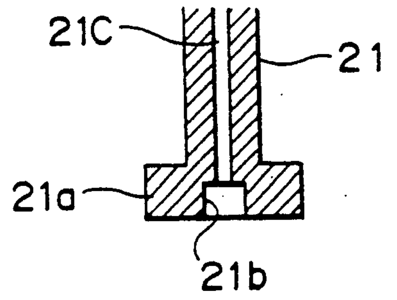
FIG. 5 is a partial sectional view showing a rod for use in the adjusting operation as shown in FIG. 4.

As shown in FIG. 5, the rod 21 is cylindrical and has a small diameter. A rectangular flange 21*a* projects from the rod 21 at a lower portion thereof and a circular concave 21*b* for positioning the cover 22 is formed in the center of the lower end surface thereof. An air sucking opening 21*c* communicating with the circular concave 21*b* is formed in the rod 21 along the axial direction thereof so that the cover 22 is held by air sucked by the sucking opening 21*c*.

Figure 6:
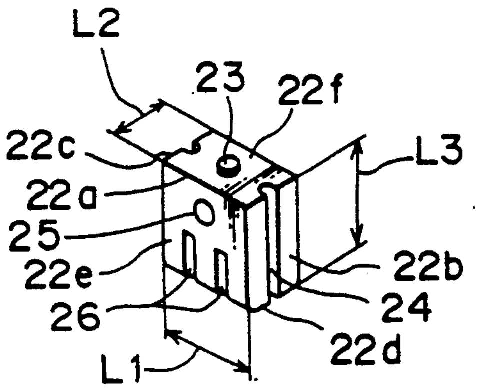
FIG. 6 is a perspective view showing a cover held at a lower end portion of the rod as shown in FIG. 5.

Referring to FIG. 6, the cover 22 is approximately cubic and has a length of L1 which is a little smaller than the interval (D) of the adjacent rollers 18 and a width of L2 which is equal to the pitch (P') between the terminals of the connector 30. The height L3 of the cover 22 is approximately equal to that of a terminal-accommodating chamber 31 of the connector 30.

Referring to FIG. 6, there is provided in the center positioning projection 23 which is removably inserted into the circular concave 21*b* disposed on the lower surface of the rod 21. A groove 24 for accommodating the wire 10 is formed along the center line from the top to the bottom of side surfaces 22*b* and 22*c* and longitudinally along the center line of the bottom surface 22*d*. The groove 24 is sectionally semicircular, the diameter of which is a little larger than the outer diameter of the wire 10. A gathering opening 25 is formed widthwise through the cover 22 from the center of an upper portion of a longitudinal side surface 22*e* to the center of an upper portion of a longitudinal side surface 22*f*. There are provided, in lower portions of the side surface 22*e*, two grooves 26 through which locking strips formed in the chamber 31 of the terminal 30 are inserted.

The lengths of the wires 10 are made to be equal to each other as follows. First, the projection 23 of the cover 22 is inserted into the concave 21*b* formed on the lower end surface of the rod 21 disposed above the wires 10 to be bent or branched. A negative pressure is introduced into the sucking opening 21*c* to hold the cover 22.

Figure 4:
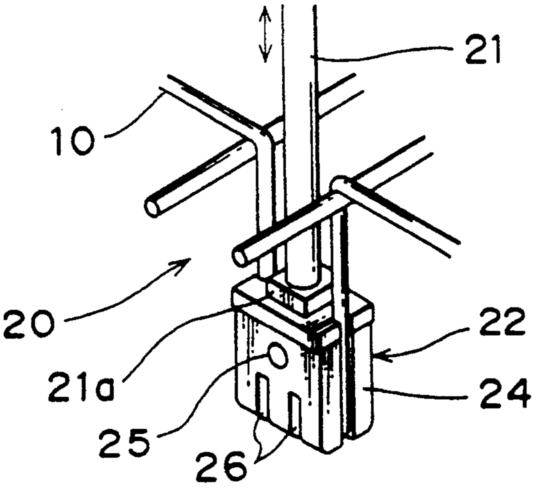
FIG. 4 is a perspective view showing the adjusting operation of wires length.

The rod 21 is moved downwardly in this condition and pressed downwardly with the wire 10 fitted into the groove 24 disposed on the bottom surface 22*d* of the cover 22. With the downward movement of the cover 22, the wire 10 is inserted into the groove 24 disposed on the side surfaces 22*b* and 22*c* of the cover 22 as shown in FIG. 4 while the wire 10 is being taken out from the reel 15 corresponding thereto. When the wire 10 has reached a predetermined downward position, the downward movement of the rod 21 is stopped and consequently, the wire 10 held by the cover 22 is retained. Thus, the branch wires 10-II and 10-III branch from the main wire 10-I by bending the main wire 10-I at each intermediate point thereof.

Then, as shown in FIG. 3, the wires 10*a*, 10*b*, 10*c*, 10*h*, and 10*i* branch from the main wire in the same position in the lengthwise direction thereof between the rollers 18A and 18B as shown in FIG. 3. The wires 10*a* and 10*b* are adjacent to each other and the wires 10*b* and 10*c* are also adjacent to each other while the wires 10*h* and 10*i* adjacent to each other are spaced a certain interval from the wire 10*c*. It is necessary to gather these wires and make them close to each other in order to accommodate them in a connector. Similarly, it is necessary to gather the wires 10*a*, 10*b*, 10*c*, and 10*e* and make them close to each other between the rollers 18D and 18E. Therefore, it is necessary to perform a process of gathering these wires.

A gathering means 35 comprises a pair of gathering pipes as shown in FIG. 7. The gathering pipe is composed of a small-diameter pipe 36 which penetrates through the opening 25 formed widthwise through the cover 22 and large-diameter pipes 37A and 37B movable with the small-diameter pipe 36 slidably inserted thereinto. The diameter of each of the large-diameter pipes 37A and 37B is greater than the outer diameter of the opening 25 of the cover 22.

The small-diameter pipe 36 is inserted into the covers 22, from the opening 25 thereof, holding the wires 10*a*, 10*b*, 10*c*, and 10*e* arranged in a straight line in the widthwise direction of the cover 22 below and between the two rollers 18D and 18E. Then, the large-diameter pipes 37A and 37B are moved toward each other as shown by arrows of FIG. 7 so that the leading ends thereof press the covers 22 disposed at both ends of the arranged covers 22. Thus, the covers 22 spaced from each other come in contact with each other.

Figure 8:
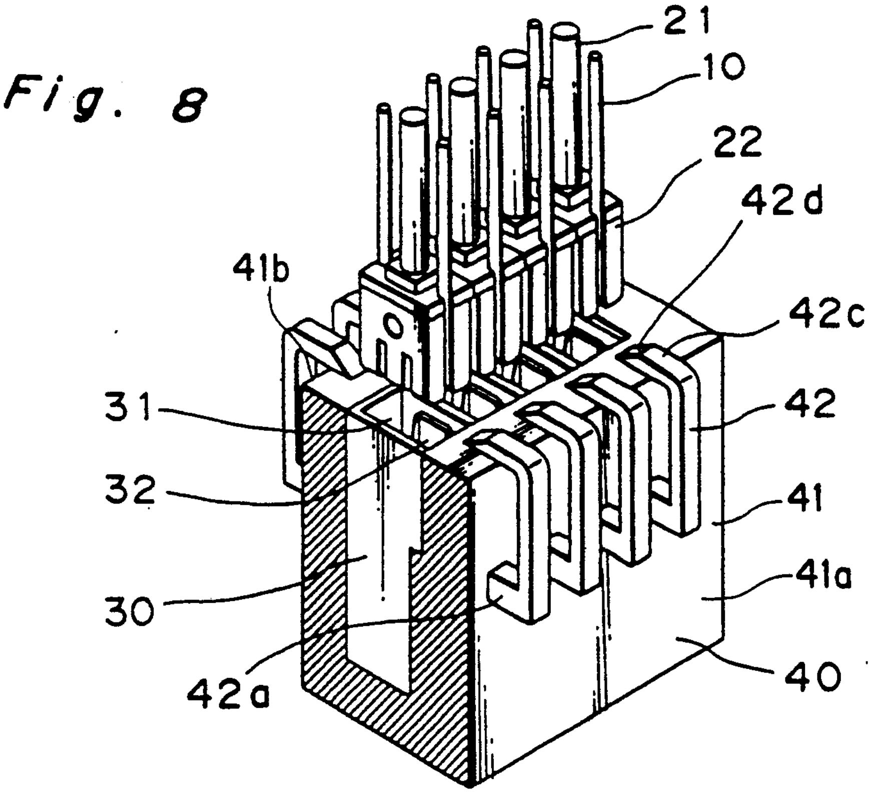
FIG. 8 is a perspective view showing a wire-connecting process by means of the insertion of the cover into a connector accommodated in a connector jig according to the assembling method of the present invention.
Figure 9:
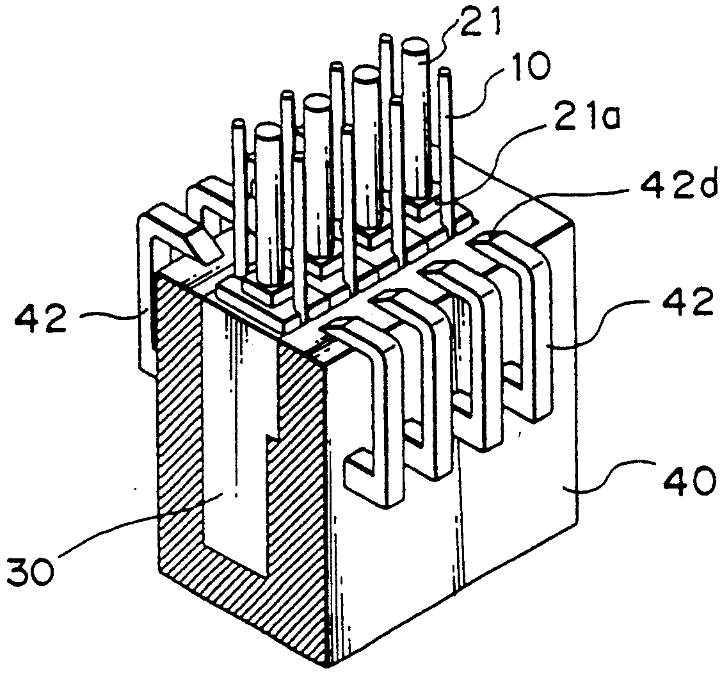
FIG. 9 is a similar view to FIG. 8 showing a modification of the connector.

Then, simultaneously with the operation of the gathering process, a jig 40 in which connector 30 is set is disposed at a position below the connector 30 as shown in FIGS. 7 and 8.

The connector 30 has a plurality of terminal-accommodating chambers 31 arranged adjacently in correspondence to each wire. A terminal 32 is accommodated in each chamber 31 in advance. Each of the adjacent chambers 31 is set at a position below each cover 22 so that each chamber 31 coincides with the corresponding cover 22, with the upper surface of the chamber 31 opened.

Then, the wires 10 are connected with the connector 30.

That is, the rod 21 mounted on each cover 22 is moved downwardly to press each cover 22 holding the wire 10 into the corresponding chamber 31. The gathering pipe 35 is removed from the cover 22 when the lower end of the cover 22 has been inserted into the chamber 31.

Then, the wire 10 held by the cover 22 is connected with the terminal 32 under pressure. Locking strips (not shown) formed on the terminal 32 engage the grooves 26 of the cover 22. As a result, the cover 22 is fixed in the chamber 31.

Figure 10:
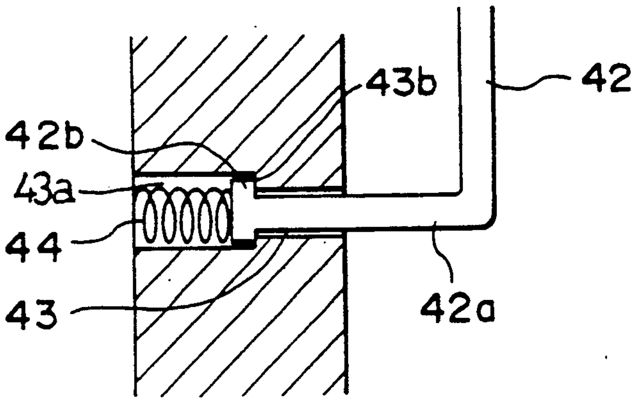
FIG. 10 is a partial sectional view showing the connector jig.
Figure 11:
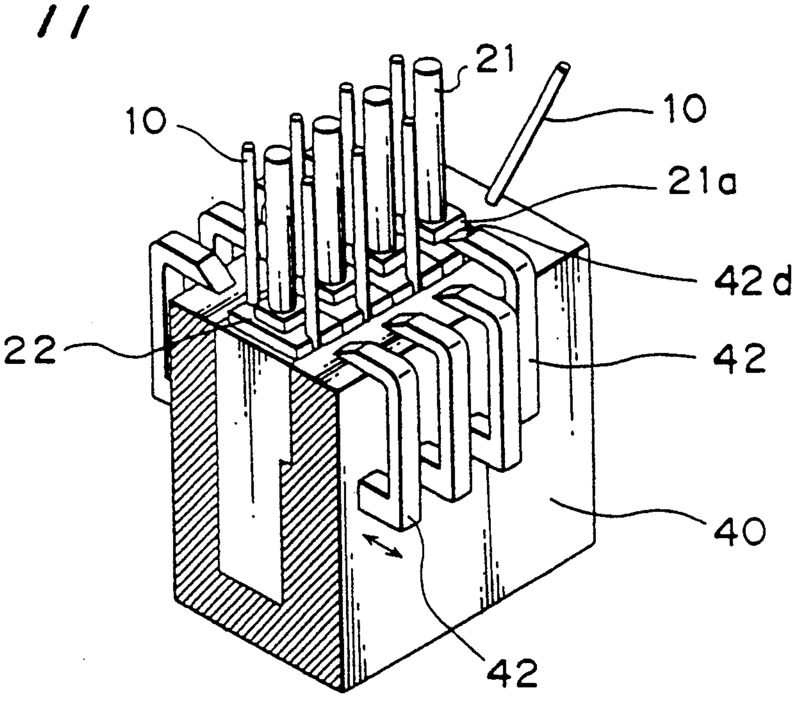
FIG. 11 is a perspective view showing cutting process according to the assembling method of the present invention.
Figure 12:
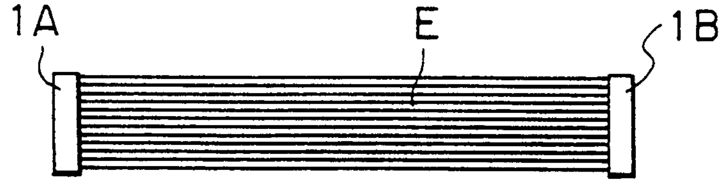
Fig. 12 PRIOR ART
FIG. 12 is a schematic plan view showing a conventional method for assembling a wire harness.
Figure 13:
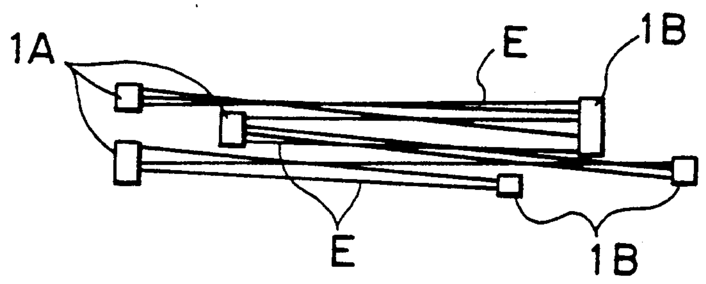
Fig. 13 PRIOR ART
FIG. 13 is a schematic plan view showing a conventional method for assembling a wire harness.
Figure 14:
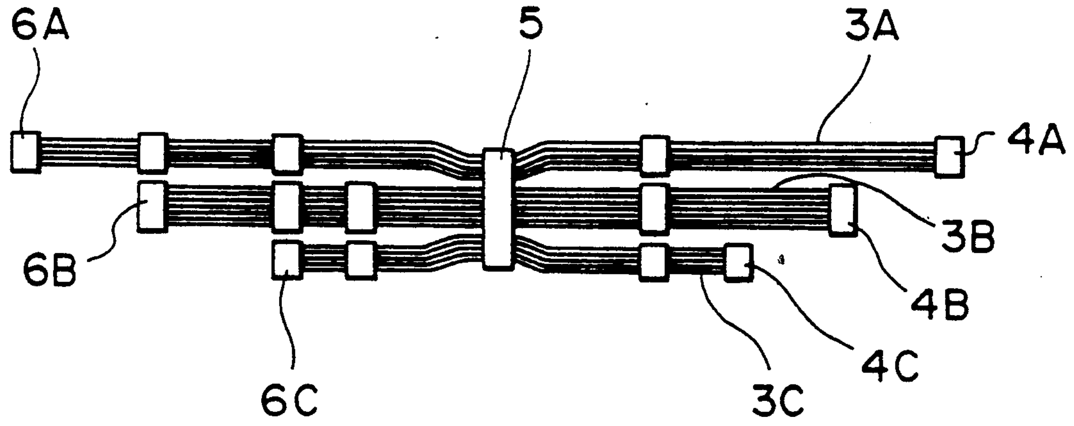
Fig. 14 PRIOR ART
FIG. 14 is a schematic plan view showing a conventional method for assembling a wire harness.

As shown in FIGS. 8 through 11, movable cutters 42 for cutting the wire 10 are mounted on the side surfaces 41*a* and 41*b* of a box-shaped casing 41 of the jig 40 in correspondence with the position of each chamber 31. As shown in FIG. 10, a lower portion 42*a* of each cutter 42 is inserted into an opening 43, having a step 43*b* therein, formed in the casing 41. A spring 44 is mounted in a large-diameter portion 43*a* of the opening 43 so that the spring 44 urges a stopping portion 42*b* disposed at the leading end of the portion 42*a* of the cutter 42. Thus, the cutter 42 is locked at the step 43*b*. The upper portion of the cutter 42 is bent (portion 42*c*) and a blade 42*d* is formed on the leading end of the portion 42*c*.

Unnecessary portions of the wire 10 connected with the connector 30 are cut by the cutter 42 of the jig 40. That is, in the cutting process, the cutter 42 is pressed into the casing 41 against the urging force of the spring 44 and the blade 42*d* is moved into the casing 41 so that the wire 10 is inserted between the blade 42*d* and the flange 21*a* of the rod 21. Thus, the wire 10 is cut. The cutter 42 is arranged on both side surfaces 41*a* and 41*b* of the casing 41 in correspondence with each cover 22. Therefore, any desired pair of the cutters 42 can be operated independently of other cutters 42.

It is possible to form only one cutter 42 movable in the lengthwise and widthwise directions of the casing 41 on both side surfaces 41*a* and 41*b* of the casing 41 so that the cutter 42 is moved to a position corresponding to an unnecessary portion of a wire to be cut.

After the cutting process terminates, the rod 21 is removed from the cover 22 by moving it upward. If it is unnecessary to cut the wire 10, the rod 21 is moved upward for removal from the cover 22 after the wire 10 is connected with the terminal 32.

Until the branching process and the process of connecting the branch wires with the connector are completed, the leading end of each of the wires 10*a* through 10*i* is held by the heads 17*a* through 17*i* at the holding position while each of the backward portions thereof remains wound around the reel 15 through the inserting openings 16*a* through 16*i* of the holding frame 16. Thus, the terminals of the bent wires 10-II and 10-III are connected with the connectors 13 and 14, respectively.

Similarly to the conventional method, each of the leading ends of the wires 10-I fixed to each of the heads 17*a* through 17*i* is connected with the connector 12 and the backward ends of the wires 10-I held by the holding frame 16 are connected with the connector 11 by cutting the backward ends thereof. Therefore, the detailed description of the connection between the wires 10-I and the connectors 12 and 11 is omitted.

As apparent from the foregoing description, according to the method of the present invention, the branch wire group can be obtained from the main wires serving as the main line of the wire harness by branching the main wires at a required position thereof. Conventionally, it is very difficult to assemble a wire harness having many branch wires automatically. But the method of the present invention is capable of automatically assembling it.

That is, according the method of the present invention, the branch wires can be obtained by bending the main wires at a required point thereof after the main wires are arranged in parallel with each other. Therefore, it is not necessary to pull out all wires wound around the reel as in the conventional method. Therefore, the branch wire group can be easily obtained from the wire group even though it is necessary to obtain many branch wire groups.

In addition, the jig comprising the rod and the cover to be used to obtain the branch wires from the main wires is capable of inserting the branch wires held by the cover into the terminal-accommodating chamber so as connect the branch wires with the connector. Thus, the assembling operation can be performed with a high efficiency with an assembling apparatus which is compact and simple in its construction.

The covers holding the branch wires spaced apart from each other are gathered. Therefore, there are no vacant chambers in the terminal-accommodating chamber. Hence, the terminal of the present invention is compact.

The cutter for cutting the wire is mounted on the connector jig. Therefore, the cutter is capable of cutting unnecessary portions of wires immediately after the required wires are connected with the connector. Hence, wiring can be accomplished with a high efficiency according to design.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for assembling a wire harness comprising a plurality of main wires serving as a main line of said wire harness and a plurality of branch wires branched from said wires, comprising the steps of:
- arranging said main wires in parallel with each other and holding each of the leading ends thereof at a certain position;
- holding a cover installed at a leading end portion of a rod at an arbitrary position of each of the main wires;
- moving said rod downwardly with one of the main wires inserted into a wire-accommodating groove formed on said cover;
- dropping said main wire held by said cover while said main wire is being unwound from a reel;
- connecting said main wire, with a connector, inserted into a terminal-accommodating chamber of said connector set at a predetermined lower position; and
- removing said rod from said cover by moving said rod upwardly.

2. A method as defined in claim 1, wherein said rod is moved downwardly so that said covers are dropped to each predetermined lower position; made to be close to each when said covers are distant from each other; and inserted into said terminal-accommodating chambers, adjacent to each other, formed in said connector.

3. A method as defined in claim 1 or 2, wherein the main wire held by said cover is dropped to a predetermined position with said connector inserted into a connector jig; said cover 'is inserted into said terminal-accommodating chamber of said connector so as to connect the main wire with said connector; and an unnecessary portion of the main wire is cut by a cutter mounted on said connector.

4. A method for assembling a wire harness comprising the steps of:
- drawing out a plurality of main wires horizontally from a reel horizontally and in parallel with each other with a predetermined space provided between the main wires along rollers; and holding each of the leading ends of the main wires at a predetermined position;
- moving a rod disposed above each main wire downwardly; inserting each required main wire into a wire-accommodating groove of a cover held at the leading end of said rod; dropping each main wire simultaneously from an arbitrary position thereof between adjacent rollers so that the length of each main wire is equal to each other; and holding each main wire at a predetermined position;
- gathering said covers so that said covers are close to each other by a pipe movable lengthwise;
- moving said rod downwardly to insert said cover holding the main wire into each terminal-accommodating chamber of a connector installed in a connector jig set at a predetermined lower position; and pressing a terminal accommodated in said terminal-accommodating chamber against the main wires held by each cover so as to connect the main wires and said terminal with each other; and
- cutting an unnecessary portion of the branch wire by a cutter provided on said connector jig; moving said rod upwardly to remove said rod from said cover; and connecting both end portions of each main wire with a connector, respectively.

5. An apparatus for assembling a wire harness comprising:
- a first means for arranging a plurality of main wires horizontally and in parallel with each other;
- second means, which receives the plurality of main wires after said first means has arranged the plurality of main wires, for obtaining branch wires from predetermined main wires, said second means comprising a plurality of rods movably mounted on the apparatus and each having a cover disposed at a lower end portion thereof, the predetermined main wires each being held by a corresponding said cover, wherein each rod moves a corresponding said cover so as to displace a required portion of each main wire;
- third means, disposed substantially perpendicularly with respect to said plurality of rods, moving said covers close to each other; and
- a connector jig, disposed in opposing relation to said second means, holding therein a connector removable therefrom so that said covers gathered by said third means and moved downwardly by said rods are inserted into each terminal-accommodating chamber of said connector.

6. An assembly as defined in claim 5, wherein said first means comprises a reel for feeding out a plurality of main wires therefrom horizontally and in parallel with each other; a holding frame disposed downstream of said reel and having a plurality of openings for passing each main wire therethrough so that the interval between adjacent main wires arranged in parallel with each other is equal to the interval between the adjacent connectors for connecting the main wires fed out from said reel; and a plurality of rollers spaced at regular intervals and disposed between said holding frame and a position downstream of said holding frame at which the leading end of each main wire is held.

7. An assembly as defined in claim 5, wherein each said rod is disposed above the arranged main wires and is moved vertically by a driving means; and each said cover is removably held at the lower end portion of a corresponding one of said rods and has a wire-accommodating groove for fitting one arranged main wire thereinto, wherein each said rod moves it corresponding said cover downwardly to drop each of the arranged main wires to a lower predetermined position so sa to obtain branch wires from the main wires.

8. An assembly as defined in claim 7, wherein each said rod has a concave for positioning a corresponding said cover on a lower surface thereof; and an air sucking opening, communicating with said concave, formed in an axial direction thereof;

further wherein each said cover has a projection which engages said concave on an upper surface thereof; said wire-accommodating groove, sectionally semicircular and formed continuously through front and rear side surfaces and a bottom surface thereof, for holding one wire therein; and an opening, for gathering the main wires, penetrating therethrough between left and right surfaces thereof.

9. An assembly as defined in claim 5, wherein said third means comprises a small-diameter pipe which is removably inserted through said opening formed widthwise through said cover and a large-diameter pipe movable with the small-diameter pipe slidably inserted thereinto so as to gather said covers, spaced a certain distance from each other, holding the main wires dropped to the lower predetermined position.

10. An assembly as defined in claim 5, wherein said connector jig further comprises a cutter movably mounted therein for cutting unnecessary portions of the branch wires held by each said cover inserted into said terminal-accommodating chamber of said connector set in said connector jig.

* * * * *